United States Patent Office 3,059,100
Patented Oct. 16, 1962

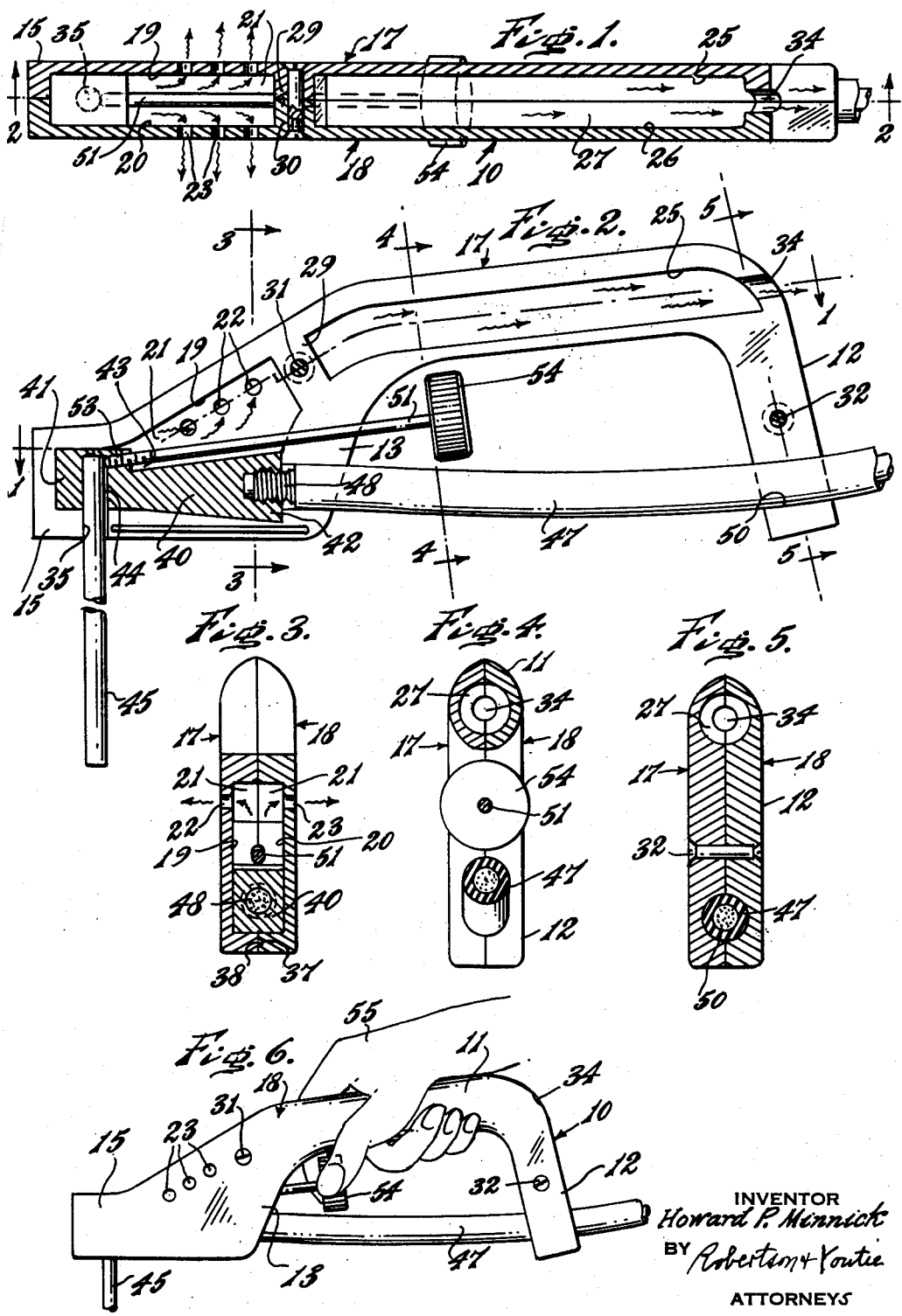

3,059,100
WELDING-ROD HOLDER
Howard P. Minnick, 228 Woodlawn Road,
Penn Square Village, Norristown, Pa.
Filed Apr. 27, 1961, Ser. No. 105,930
6 Claims. (Cl. 219—144)

This invention relates to a highly improved construction of welding-rod holder.

The instant invention is of the general type disclosed in my United States Patent No. 2,898,446, and constitutes an improvement thereover.

As noted in said patent, the relatively great heat generated by the welding operation presents many serious difficulties, such as discomfort and possible injury to an operator, reduced operator efficiency, and others.

Another disadvantage inherent in prior welding-rod holders is the necessity for two-handed operation in removal and replacement of a welding rod. In addition to the general inconvenience in the replacement of a welding rod according to prior usage, it should be noted that the operation of replacing a welding rod is the only operation of the welding procedure requiring the use of two hands. Thus, except for this rod-replacement operation, which occupies a relatively small part of the total welding procedure, an operator may use only a single hand.

Accordingly, it is one object of the present invention to provide a welding-rod holder of a unique structure enabling a used welding rod to be removed and a new rod replaced by a quick and easy manual operation requiring the use of only a single hand.

It is another object of the present invention to provide a welding-rod holder which overcomes the difficulties described hereinbefore and effectively reduces or eliminates the adverse effects of heat in the welding operation.

It is still a further object of the present invention to provide a welding-rod holder having the advantageous characteristics mentioned in the preceding paragraphs, which is simple, rugged and durable in construction, long-lasting and trouble-free in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a longitudinal sectional view taken through a welding-rod holder constructed in accordance with the teachings of the present invention, as along the line 1—1 of FIGURE 2;

FIGURE 2 is a longitudinal sectional view taken substantially along the line 2—2 of FIGURE 1;

FIGURE 3 is a transverse sectional view taken substantially along the line 3—3 of FIGURE 2;

FIGURE 4 is a transverse sectional view taken substantially along the line 4—4 of FIGURE 2;

FIGURE 5 is a transverse sectional view taken substantially along the line 5—5 of FIGURE 2; and FIGURE 6 is a longitudinal elevational view showing a welding-rod holder of the present invention in operative association with a user's hand.

Referring now more particularly to the drawings, and specifically to FIGURE 6 thereof, there is illustrated therein a handle generally designated 10 of approximately C shape having an intermediate or bight portion 11 and end or leg portions 12 and 13. The handle 10 is generally flat or coplanar, as best seen in FIGURE 1; and, projecting outward from the distal end of leg portion 13, substantially coplanar with the remainder of the C-shaped handle 10, is an extension 15. That is, the extension 15 extends from the distal end of the leg 13 in the direction away from the leg 12.

The handle 10 may be formed of two substantially identical, complementary sections 17 and 18 arranged in generally congruent, facing engagement with each other, having their engaging surfaces extending generally along the longitudinal center line of the handle. In the handle region of leg 13 and extension 15, the handle sections 17 and 18 are respectively formed with complementary facing recesses 19 and 20 defining an internal hollow 21. In the upper region of the internal hollow 21, as seen in FIGURE 2, the recesses 19 and 20 may be formed with through openings, vents or ports 22 and 23, respectively.

In the handgrip region 11, each of the sections 17 and 18 is formed with a longitudinally extending internal recess, as at 25 and 26, respectively, with the recesses in complementary, congruent facing relation to define an internal hollow 27 in the handgrip portion. The internal hollows 21 and 27 approach each other in the region of leg 13, the internal hollows there terminating proximate to and spaced from each other, communication therebetween being closed by wall portions 29 and 30 of the longitudinal sections 17 and 18, respectively, in facing engagement with each other. The handle sections 17 and 18 may be secured together in their congruent facing engagement by suitable fastener means 31 extending transversely through the engaging wall portions 29 and 30, and additional suitable fastener means 32 extending transversely through the facing sections in the region of leg 12.

Each longitudinal section 17 and 18 is formed in the handle portion 11 remote from the leg 13 with a pair of facing open-ended recesses combining to define a through port or vent 34 communicating between the interior of hollow 27 and the exterior of the handle 10. The port 34 extends longitudinally of the handle portion 11, opening through the rightward end thereof, as seen in FIGURE 6. The sections 17 and 18 are further formed with complementary, facing, open-ended recesses in the region of extension 15, which recesses combine to define a through hole or bore 35 opening from the lower part of internal hollow or chamber 21 downward for communication with the exterior of the handle. Proximate to and longitudinally inward of the hole 35, the lower engaging regions of sections 17 and 18 may be provided with a suitable interfitting or lapping joint 37, 38. More specifically, extending along the lower regions of leg 13 and extension 15, the facing engaging surfaces of sections 17 and 18 may be respectively formed with an interfitting tongue or rib 37, and groove 38. This effectively reduces the transmission of heat by radiation from the welding operation to the interior of the handle.

A generally solid connector element or block 40 of electrically conductive material is conformably engaged in a part of the internal hollow or chamber 21, the lower part as seen in FIGURE 2, so as to leave unoccupied the upper part of the chamber, which is provided with the vent ports 22 and 23. The block 40 extends longitudinally of the handle 10, having one end 41 located in the outer region of the outward extension 15, and the other end 42 located in the distal region of the leg 13. As best seen in FIGURE 2, the inner or upper side of the block 40 is cut away, as at 43, at the medial region of the block, so as to leave its outer end region 41 upstanding beyond the adjacent medial block region. Formed in the outer block end region 41 may be a hole or cavity 44 in substantial registry with the hole or opening 35 for receiving in the connector block one end of a welding rod 45.

A supply cable 47 may extend across the generally C- shaped configuration of handle 10, having one end extending through the distal end of leg 13 for electrical connection, as at 48, to the longitudinally inner end region 42 of the connector block. From connection of the cable end 48 with the connector block 40, the cable 47 extends across the opening of the C-shaped handle 10, thence through an opening 50 formed in the distal end region of leg 12, for connection to a source of electrical supply.

A clamping element or rod 51 may have one end portion 52 located on the inner side of the handgrip portion 11 within the opening of the C-shaped handle configuration, and extends therefrom rotatably through the handle leg 13 and into the upper, unoccupied part of the chamber or hollow 21. The clamping member or rod 51 may lie substantially coplanar with the handle 10, and may extend in general parallelism with the handgrip portion 11. The longitudinally outer end 53 of the clamping member or rod 51 may be externally threaded and extend in threaded engagement into the upstanding portion of connector-block end region 41 for endwise engagement transversely into the welding-rod-receiving hole 45. On the inner end region of the clamping rod 51, within the C-shaped handle 10, there may be provided an actuating knob 54, for manually turning the clamping rod to effect extension of the rod end 53 into and withdrawal from the hole 44.

As best seen in FIGURE 6, a single hand 55 of an operator may be employed simultaneously to both grasp the hand portion 11 of the handle and rotate the actuating knob 54 of the clamping element 51. It has been found in practice that this permits of entirely satisfactory results by welding operators having only one hand or arm. In the condition of hand 55 in FIGURE 6, the clamping element 51 may be withdrawn and the handle moved to engage an end of a welding rod 45 in the rod-receiving hold 44. The welding rods may be conveniently carried by a one-armed welder in a pocket, say a shirt pocket, projecting therefrom, to facilitate the rod-replacement procedure. Of course, only a single hand is necessary to release a used rod, permitting the same to drop into a suitable receptacle from the holder. Upon tightening of the clamping element 51, a rod 45 is, of course, securely held in position and electrical connection with the welding-rod holder.

In use, the provision of the partially unoccupied chamber or hollow 21 having ports or vents 22 in the unoccupied portion has been found highly advantageous in the removal and dissipation of heat from the region of leg 13 and extension 15. Further, the location of wall portions 29 and 30 in position to block fluid communication between the chambers 21 and 27 has been found highly effective in maintaining at a minimum the temperature of the handgrip portion 11. Of course, heat from the handgrip portion 11 may be dissipated by air movement from the chamber 27 exteriorly through the opening 34.

It will now also be apparent that the welding-rod holder of the instant invention is substantially entirely symmetrical about the longitudinal plane of FIGURE 2, so as to be equally well-suited for use by both left-handed and right-handed operators. As noted hereinbefore, the interfitting surface formations 37 and 38 prevent the transmission of radiant heat from the work to the connector block, as well as excluding the possibility of hot sparks or other undesirable substances penetrating from the work to the block.

It should be noted that the downwardly opening welding-rod-receiving hole or socket 44 has its upper end closed and terminating within the connector block, to positively locate the welding rod 45 at a proper position, and prevent possible damage to the holder by a welding rod.

From the foregoing, it is seen that the present invention provides a welding-rod holder which fully accomplishes its intended objects and is well-adapted to meet practical conditions of manufacture and use.

Although the present invention has been described in some detail by way of illustration and example for purposes of clarity of understanding, it is understood that certain changes and modifiactions may be made within the spirit of the invention and scope of the appended claims.

What is claimed is:

1. A welding-rod holder comprising a generally C-shaped handle of nonconductive material having its intermediate region adapted to serve as a handgrip portion, an outward extension of nonconductive material on one end of said C-shaped handle, said outward extension and the adjacent handle region being formed with an internal hollow, said internal hollow being closed from the remainder of said handle, a conductive connector block arranged longitudinally of and within said outward extension conformably engaged in one part of said hollow, the remaining part of said hollow being formed with through vents communicating between the interior of said hollow and the ambient atmosphere for exhausting heat from said block ahead of said handgrip portion, the outer end of said block being provided with an opening for releasably receiving a welding rod and the inner end of said block being adapted for attachment to one end of an electrical-supply conductor extending between the ends of said handle, the other end of said handle being provided with an opening for receiving a portion of said supply conductor, to thereby maintain said supply conductor safe from said handgrip portion.

2. A welding-rod holder according to claim 1, in combination with a clamping element generally coplanar with said handle having one end proximate to and inward of said handgrip portion and extending therefrom into said one end of said handle for engagement in said connector block to clamp a rod in said block opening, and manually actuable means on said one end of said clamping element for convenient one-hand clamping and unclamping of a welding rod while holding said handgrip portion.

3. A welding-rod holder according to claim 2, said clamping element extending in threaded engagement into said connector block.

4. A welding-rod holder according to claim 2, said clamping element extending from said one end thereof through said remaining part of said internal hollow for engagement of its other end in said block, whereby said clamping element receives a minimum of heat from said connector block and dissipates heat in said remaining hollow part.

5. A welding-rod holder according to claim 1, said handle comprising a pair of substantially identical complementary generally C-shaped sections secured in facing engagement with each other, said sections each having a recess formed in its facing side which recesses combine to define said internal hollow, and said vents being formed in the recessed portions of said sections.

6. A welding-rod holder according to claim 1, said handgrip portion having an internal hollow spaced from and out of communication with said first-named hollow and formed with a heat-escape port remote from said one handle end communicating between the interior and exterior of said handgrip portion.

References Cited in the file of this patent

UNITED STATES PATENTS

| | | |
|---|---|---|
| 2,162,633 | Miller | June 13, 1939 |
| 2,898,446 | Minnick | Aug. 4, 1959 |